(12) United States Patent  (10) Patent No.: US 7,650,345 B2
Buerer et al.  (45) Date of Patent: Jan. 19, 2010

(54) ENTITY LOOKUP SYSTEM

(75) Inventors: David R Buerer, Bellevue, WA (US);
Duncan M Lawler, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 382 days.

(21) Appl. No.: 11/068,292

(22) Filed: Feb. 28, 2005

(65) Prior Publication Data

US 2006/0195458 A1 Aug. 31, 2006

(51) Int. Cl.
G06F 7/00 (2006.01)
G06F 17/30 (2006.01)
G06F 17/00 (2006.01)

(52) U.S. Cl. ..................................... 707/100
(58) Field of Classification Search .................. None
See application file for complete search history.

(56) References Cited

U.S. PATENT DOCUMENTS

| 6,031,544 | A  | * | 2/2000 | Yhann | 345/620 |
| 6,392,705 | B1 | * | 5/2002 | Chaddha | 348/388.1 |
| 6,882,853 | B2 | * | 4/2005 | Meyers | 455/457 |
| 2002/0013656 | A1 | * | 1/2002 | Namba | 701/200 |
| 2002/0107918 | A1 | * | 8/2002 | Shaffer et al. | 709/203 |
| 2005/1009122 |  | * | 4/2005 | Shaw et al. | 707/100 |
| 2005/0278378 | A1 | * | 12/2005 | Frank | 707/104.1 |

* cited by examiner

*Primary Examiner*—Charles Rones
*Assistant Examiner*—Alicia M Lewis
(74) *Attorney, Agent, or Firm*—Lee & Hayes, PLLC

(57) ABSTRACT

In an electronic document such as a map, an entity lookup system associates primitive data with entity data though parallel or corresponding grids of a primitive quad-tree and an entity quad-tree. A key is assigned to grids in the primitive quad-tree in association to particular grids in the entity quad-tree.

20 Claims, 7 Drawing Sheets

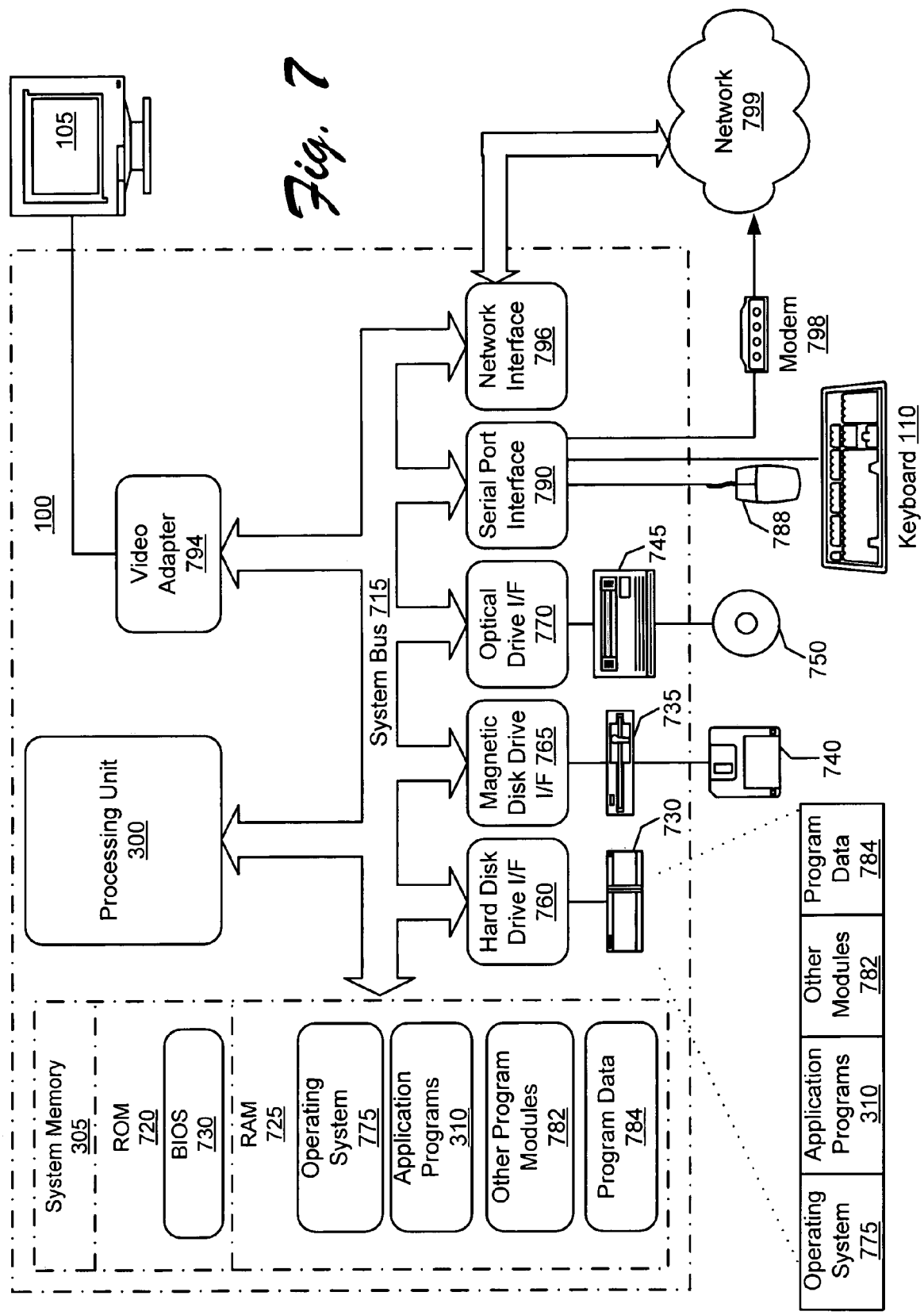

ENTITY LOOKUP SYSTEM

TECHNICAL FIELD

This invention relates to associating primitive data with entity data describing the primitive data.

BACKGROUND

Primitives which may be referred to as spatial data or primitive data, are basic elements, such as lines, curves, and polygons, which can be combined to create more complex graphical images. In the context of an electronic document such as a map created by a mapping application, primitive data may define locations on the map. Primitive data may be described by a Cartesian coordinate system such as an X-Y convention in two-dimensional space.

A group of primitive data may make up a particular shape. In the context of a map, the particular shape (i.e., group of primitive data) may define a city, county, state, etc. Entity data may be associated with primitive data or a group of primitive data. Such entity data can describe or provide detail (information) as to the particular primitive data or group of primitive data. For example, entity data may include the name, demographics, and population of a particular region defined by the group of primitive data.

In a specific example, a group of primitives may represent the shape of the United States at a particular resolution. A different set of primitives might be used to represent the shape of the United States at a higher resolution. Each set of primitives needs to be stored at a different level of detail. Such levels of detail may be represented by a quad-tree arrangement, where a given level is the grids of the previous level divided into four equal-sized grids. The primitives assigned to that level are associated with the quadrants they intersect. At the subsequent level of detail, each quadrant is sub-divided into four equally sized smaller quadrants, each occupying a proportionally smaller part of the coordinate space. The higher detail primitives assigned to this level are again associated with the quadrants they overlap. The division of grids in a quad-tree can continue to infinitesimal degrees of level of detail. Additionally, at each level of detail new features which had no appropriate representation at higher levels may be introduced. As an example, the lowest level of detail might contain only the primitives for the United States. The next higher level of detail would contain primitives for the United States and each of the states. The next higher level would contain higher resolution primitives for the United States, all of the states, and introduce primitives representing the counties, and so on.

If entity data is used to describe the primitive data or groups of primitive data that represent the United States, the state of Texas, the city of Amarillo, and a street in Amarillo, separate entries would have to be made for each group of primitive data. In other words, the group of primitive data representing the United States would have its own entry for entity data, the group of primitive data representing the state of Texas would have its own entry for entity data, the group of primitive data representing the city of Amarillo would have its own entry for entity data, and the group of primitive data representing a street in Amarillo would have its own entry for entity data.

In many situations, it is necessary to retrieve information through spatially directed queries. An example of such a query would be to return all the primitives and associated entity data that intersects some subset of a given coordinate space. It is desirable to have the entity data stored such that a minimum amount of information is scanned in order to retrieve the data required to satisfy the query. It is also desirable to store entity data likely to be retrieved together in physically close locations on storage media to minimize retrieval time.

When storing multiple levels of detail of primitive data in a quad-tree arrangement as described above, it may be necessary to determine a reasonable storage location and reference system for the entity data to be associated with primitive data or groups of primitive data. An approach is to store the entity data in a relational table tied to the primitive data (i.e., groups of primitive data) with a key. A second approach as described above is to duplicate the entity data with each association of primitive data (i.e., groups of primitive data). The first approach has the drawback of losing storage locality when accessing the entity data, while the second approach involves wasteful duplication of entity data.

SUMMARY

In an electronic document such as a map, an entity lookup system includes a primitive quad-tree that includes grids that encompass primitive data that define shapes in the electronic document. The entity lookup system includes an entity quad-tree that includes grids that correspond to grids in the primitive quad-tree, and association is made as to grids in the primitive quad-tree and grids in the entity quad-tree. The grids in the entity quad-tree provide information as to primitive data encompassed by the grids in the primitive quad-tree. The entity lookup system is used to navigate between the two quad-trees.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

FIG. 7 is a block diagram of a detailed implementation of a computer or computing device in which an application program may be ran that creates an electronic document that includes an address hyperlink feature.

DETAILED DESCRIPTION

The following disclosure describes techniques in which primitive data or groups of primitive data are associated with entity data describing the primitive data or groups of primitive data through a parallel quad-tree arrangement.

Figure 1:
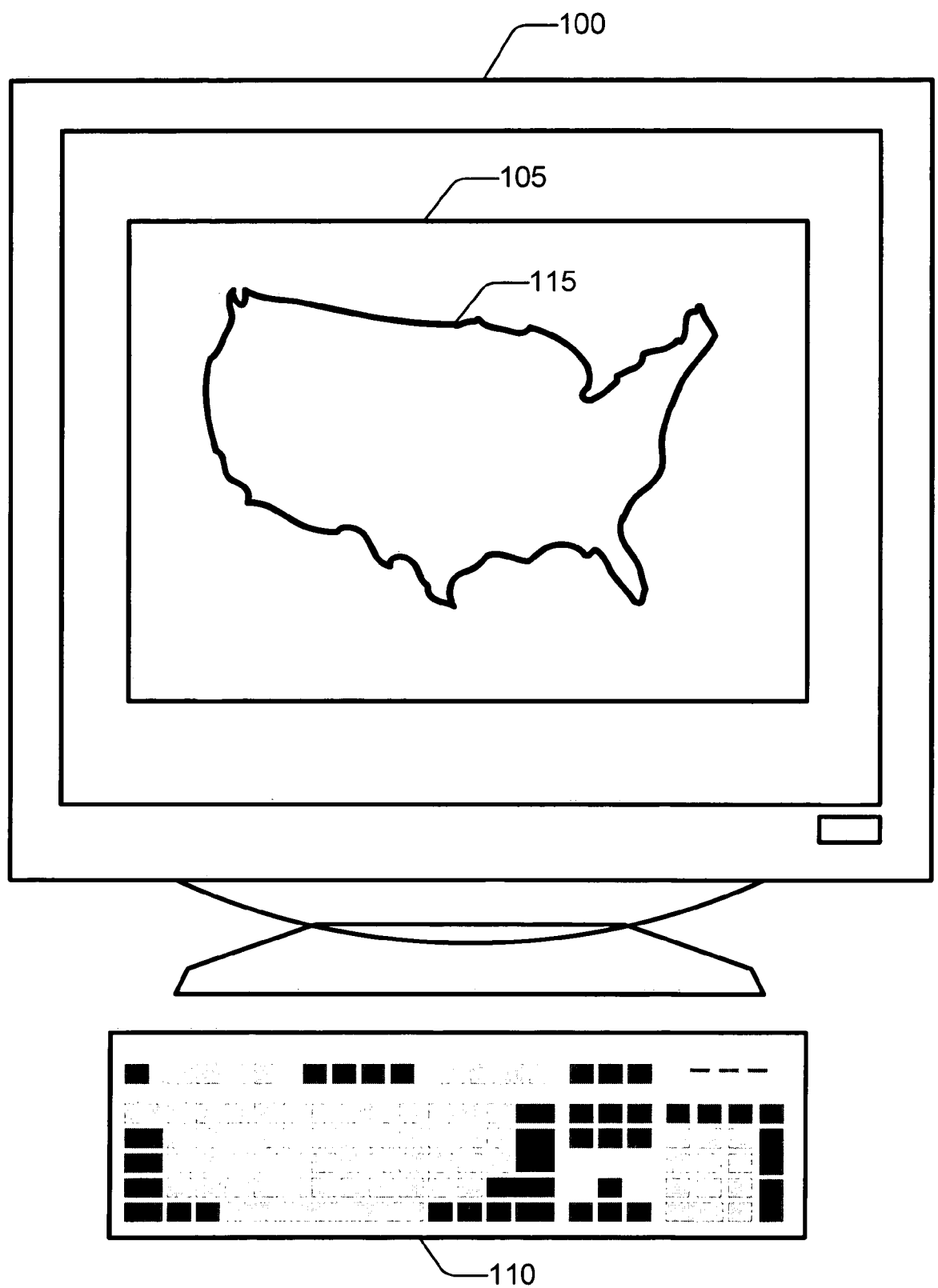
FIG. 1 is an illustration of an electronic document such as a map that includes primitive data associated with entity data through a parallel quad-tree arrangement.

FIG. 1 shows a map that includes primitive data that are associated with entity data through a parallel quad-tree arrangement. A computer or computing device 100 includes a screen 105 and is connected to or includes an input device such as a keyboard 110. An electronic document is displayed on the computing device 100 through display 105. In this example, the electronic document displayed is a map 115 of the United States. Computing device 100 may be one of various devices such as a desktop personal computer (PC), a laptop PC, a tablet PC, a personal digital assistant (PDA), or smart or feature phone.

Map 115 is made up of spatial data also known as primitives or primitive data that represent shapes such as lines, points, polygons, etc. In this example, a group of primitive data makes up the map 115 that define the United States. Furthermore, subsets of the group of primitive data that make up map 115 may define states, cities, streets, etc. in the United States.

The map 115 is part of a space that may be divided into four grids. Each of the four grids may be further divided into four grids. This division of grids can continue further. Such a division or arrangement of the grids is referred to as a quad-tree and is described in further detail below. Each particular grid in the created primitive quad-tree contains a particular group of primitive data. Each grid in the primitive quad-tree can be given a unique number or index that distinguishes it from other grids in the primitive quad-tree.

Entity data provides a description or information as to a group of primitive data. The description or information may include a name associated with a group of primitive data such as "Texas" to the group of primitive data that represents the state of Texas. Entity data may also include any other data such as demographics, sights of interests, historical information, etc., that may be associated with a particular group of primitive data.

A quad-tree for entity data is created that parallels the quad-tree arrangement describing the primitive data. For each primitive quad-tree grid representing a group of primitive data, a parallel grid is represented in an entity quad-tree. The parallel grids in the entity quad-tree may have matching indices or numbers as grids in the primitive quad-tree. The parallel grids in the entity quad-tree are representative of storage locations where entity data may be stored.

A key is associated with each primitive in each grid in the primitive quad-tree. Such a key is used to associate a particular grid representing a group of primitive data to a particular grid in the entity quad-tree, and to locate the specific entity data in the entity quad-tree associated with each primitive. This arrangement is further discussed in detail below.

Figure 2:
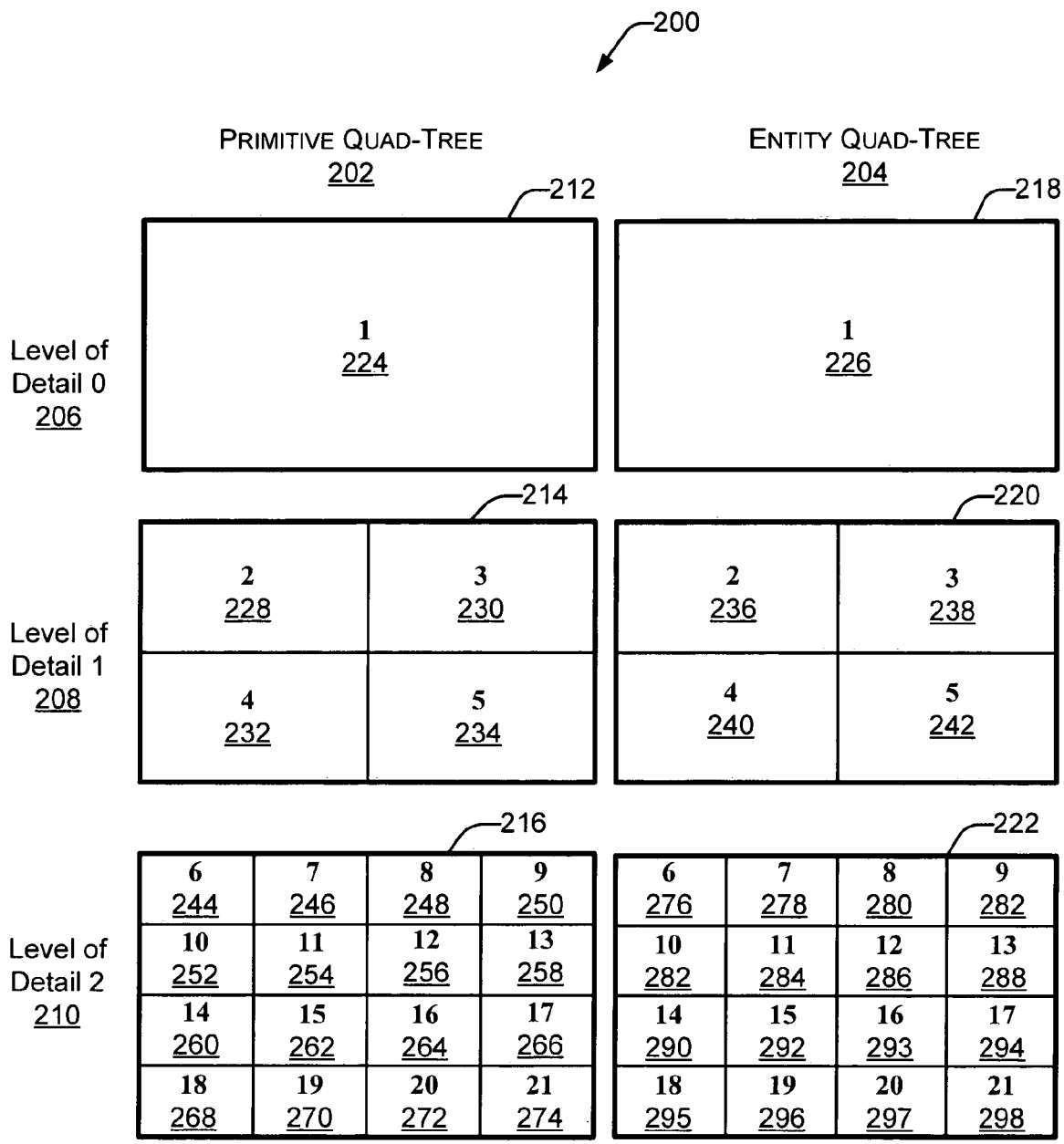
FIG. 2 is an illustration of a primitive quad-tree and a related entity quad-tree that relates primitive data with entity data.

FIG. 2 shows a primitive quad-tree and an entity quad-tree. In particular, a entity lookup system 200 includes parallel primitive quad-tree 202 and entity quad-tree 204, where corresponding grids exist in primitive quad-tree 202 and entity quad-tree 204.

Primitive quad-tree 202 represents geometric space where primitive data representing shapes such as lines, points, polygons, etc. exist. In the context of an electronic document such as a map (e.g., map 115) generated by a mapping application, such primitive data may be representative of geographic places such as countries, states, counties, cities, streets, etc.

Entity quad-tree 204 is a parallel or corresponding quad-tree to primitive quad-tree 202. In other words, grids represented in entity quad-tree 204 have parallel or corresponding grids in primitive quad-tree 202. In this example, grids in entity quad-tree 204 have corresponding indices or numbers as grids in primitive quad-tree 202. Entity quad-tree 204 represents areas in storage or memory where data describing or providing details of particular primitive data or groups of primitive data are stored.

Various levels of detail may be provided that describe geometric space in primitive quad-tree 202 and areas of storage in entity quad-tree 204. In this example, the top level of detail is represented by "level of detail 0" 206; the next level of detail is represented by "level of detail 1" 208; and the greatest level of detail is represented by "level of detail 2" 210. Greater levels of detail may be provided beyond "level of detail 2" 210.

The entity lookup system 200 provides that higher level of detail grids are divided into four grids. In this example, for primitive quad-tree 202 the "level of detail 0" 206 is represented by space 212. "Level of detail 1" 208 of primitive quad-tree 202 is represented by space 214 which segments or divides space 212 into four grids. "Level of detail" 210 of primitive quad-tree 202 is represented by space 216 which further segments or divides space 214 into 16 grids. Likewise, for entity quad-tree 204, "level of detail 0" 206 is represented by space 218. "Level of detail 1" 208 of entity quad-tree 204 is represented by space 220 which segments or divides space 218 into four grids. "Level of detail" 210 of entity quad-tree 204 is represented by space 222 which further segments or divides space 220 into 16 grids.

In the arrangement formed by entity lookup system 200, corresponding or parallel grids are provided by the primitive quad-tree 202 and the entity quad-tree 204. For example, at "level of detail 0" 206, "grid 1" 224 of primitive quad-tree 202 corresponds to "grid 1" 226 of entity quad-tree 204 (i.e., the grids are identified by the same index or number of "grid 1"). At "level of detail 1" 208, space 214 includes "grid 2" 228, "grid 3" 230, "grid 4" 232, and "grid 5" 234. Space 220 includes "grid 2" 236, "grid 3" 238, "grid 4" 240, and "grid 5" 242. Furthermore, for "level of detail 1" 208, "grid 2" 228 corresponds to "grid 2" 236; "grid 3" 230 corresponds to "grid 3" 238; "grid 4" 232 corresponds to "grid 4" 240; and "grid 5" 234 corresponds to "grid 5" 242.

At "level of detail 2" 210, space 216 of primitive quad-tree 202 includes grids 244-274, and space 222 of entity quad-tree 204 includes grids 276-298. Grids in space 216 of primitive quad-tree 202 have corresponding grids in space 222 of entity quad-tree 204.

Figure 3:
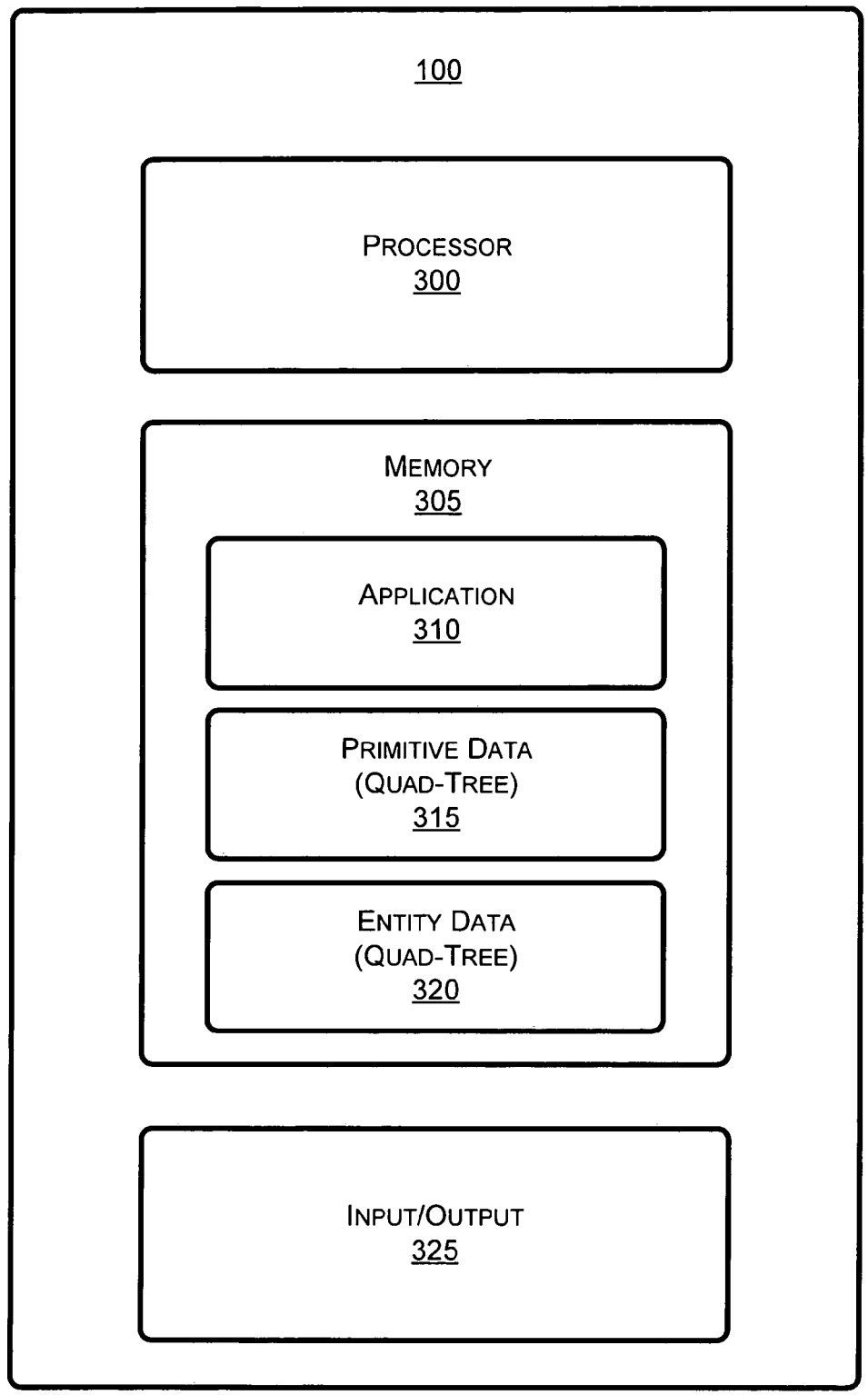
FIG. 3 is a block diagram of a computer or computing device that associates primitive data with entity data using a parallel quad-tree arrangement.

FIG. 3 shows computing device or computer 100 in more detail. Computer 100 may be one of various devices such as a desktop personal computer (PC), a laptop PC, a tablet PC, a personal digital assistant (PDA), or smart or feature phone. The exemplary architecture of computer 100 is further discussed in greater detail below in FIG. 7.

Computer 100 includes a central processing unit (CPU) or processor 300 and a memory 305. Processor 300 accesses memory 305 through a system bus (not shown). The memory 305 includes an application program 310 that creates the electronic document or map 115 described in FIG. 1.

Primitive data that defines an electronic document or map is stored in primitive data storage 315. The primitive data is particularly stored and structured in the form of a primitive quad-tree as described above. Furthermore, as described in greater detail below, primitive data storage 315 stores a key that is associated with each group of primitive data or primitive quad-tree grid. Such as a key is used to relate to a particular grid in an entity quad-tree that is representative of a storage location for entity data. Such entity data that is related or associated with a group of primitive data (i.e., a grid associated with a group of primitive data) is stored in entity-data storage 320. The entity data is particularly structured and referenced in the form of an entity quad-tree as described above.

An input/output component 325 is included in computing device 100. The input/output component 325 allows a user to access data such as entity data stored in entity data storage 320. In a particular example, a user selects or chooses a point on a map (e.g., map 115) and is provided entity data that relates to the chosen point.

Figure 4:
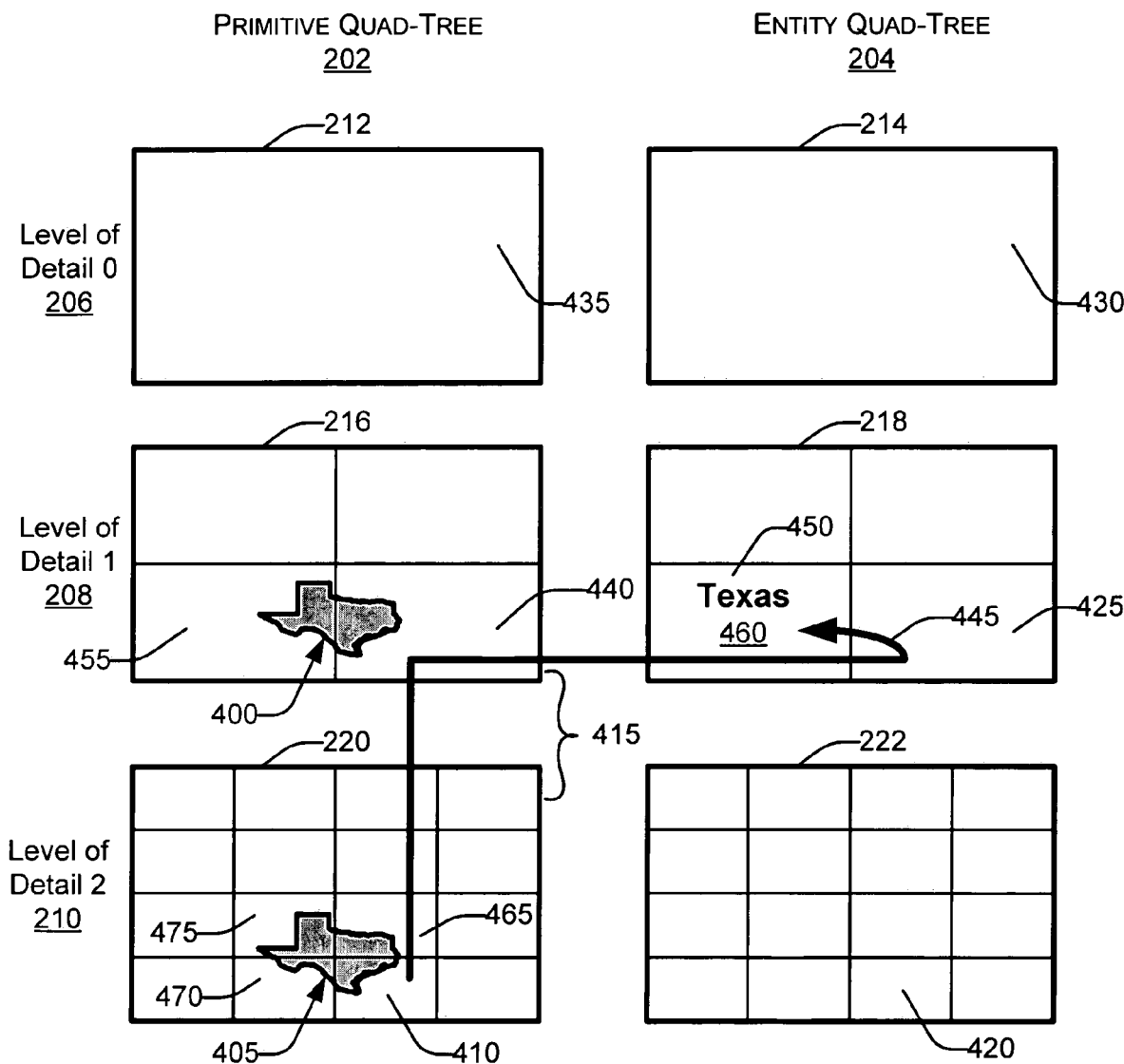
FIG. 4 is an illustration relating a group of primitive data to a particular entity quad-tree grid.

FIG. 4 shows an exemplary relationship of a group of primitive data to an entity data grid or location. In this example, a group of primitive data 400 defines the state of Texas at "level of detail 1" 208. A different set of primitives, 405, defines the state of Texas at "level of detail 2" 210. A grid 410 contains a portion of the group of primitive data 405; however, grid 410 does not totally encompass the group of primitive data 405.

Space 216 provides grids that more generally encompass group of primitive data 405. Therefore, in relating primitive quad-tree grid 410 to an entity quad-tree grid that describes the group of primitive data 405, a delta is determined as to the level of detail from "level detail 2" 210 where grid 410 resides to the "level of detail 1" 208 which more generally encompasses group of primitive data 405. The delta in level of detail is represented by level of detail delta 415, where such a delta has a value of "1". In other situations, the level of detail delta may be a value greater than "1".

In this example, although group of primitives 405 is defined by more than one grid in space 216, instead of going up to the next level of detail (i.e., "level of detail 0" 206), an entity grid association is made at "level of detail 1" 208 and not at "level of detail 0" 206. If this system were followed strictly, the entity grid associated with any given primitive grid would have to be the same extent as the grid itself, or one of the parent grids of the given primitive grid. So the entity data is stored in entity grids 420, 425, or 430. The smallest primitive grid completely enclosing all primitive representations at all levels of detail is grid 435. Therefore entity data is stored in entity grid 430. This has an undesirable effect in the case of relatively small primitives that cross dividing lines between grids. If the dividing line was also a dividing line in the first level of detail, the smallest enclosing grid is the grid at "level of detail 0" 206. This would cause too much entity data to be stored at this level. To solve this, a provision is made to allow the entity grid associated with a given primitive grid to be a sibling grid of a direct parent grid. In the example, the direct parent of primitive grid 410 is primitive grid 440 which would normally be associated with entity grid 425. The key with each primitive includes a direction flag 445 to indicate that the entity data is not stored in grid 425, but in grid 450. This direction flag is referred to as a "fan value" and has five possible values: "North, South, West, East, or None". In the example, primitives representing the state of Texas 405 in grid 410 of space 220 will have a key with an offset value 415 of 1, and a direction flag or fan value 445 of "West". Without this provision, the entity data would have to be stored at "level of detail 0" 206, in entity grid 430. This is undesirable as it has the effect of distributing the data less evenly and is less efficient for spatially directed retrieval.

In this example, grid 440 of space 216 is a subset of the group of primitive data 400. The key for the primitives in this grid would have an offset of 0 (indicating the entity data is stored at the same level), and a direction flag to the left, indicating the entity data is stored in grid 450 of space 218 instead of 425. The primitives stored in grid 455 of space 216 contain a key with a level offset of 0, and no direction flag. In this example the grids are rectangles or squares, so a fan value may be "North, South, West, East, or None". This system would also apply to any other regularly tileable grid system. Other examples of grids can include hexagon or shapes that mesh with one another in a particular space.

The entity data in grid 450 is "Texas" 460. In this case, "Texas" describes or provides a description of the group of primitive data 400. In particular, grid 450 is associated with a location in memory of a device that stores entity data. In this case, the entity data is the name "Texas"; however, other information or description may be provided as described above, as entity data other than just a name associated with a geographical location. This would include any non-spatial attributes that apply equally to all primitives representing the object.

In this example, the entity description for grid 410 (which includes a subset of group of primitive data 405) is associated with entity grid 450. To get to entity quad-tree grid 450, a key is associated with primitive quad-tree grid 410—the key being "1" level of detail delta (as represented by level of detail delta 415); and a fan value of "West" to go from entity quad-tree grid 425 to entity quad-tree grid 450 that contains the entity data or description. In other cases, the key may include indices or numbers assigned to grids in the primitive quad-tree 202 and entity quad-tree 204.

Furthermore, other primitive quad-tree grids may be associated with the entity quad-tree grid 450. For example, primitive quad-tree grid 465 would have a key that has "1" level of detail, and a fan value of "West"—the same key as primitive quad-tree grid 410. Primitive quad-tree grid 470 would have a key that has "1" level of detail, and fan value of "None". Primitive quad-tree grid 475 would have the same key as primitive quad-tree grid 470. Primitive quad-tree grid 475 would have a key that has "0" level of detail value and a fan value of "None", since entity quad-tree grid 455 is the corresponding grid to primitive quad-tree grid 455.

Figure 5:
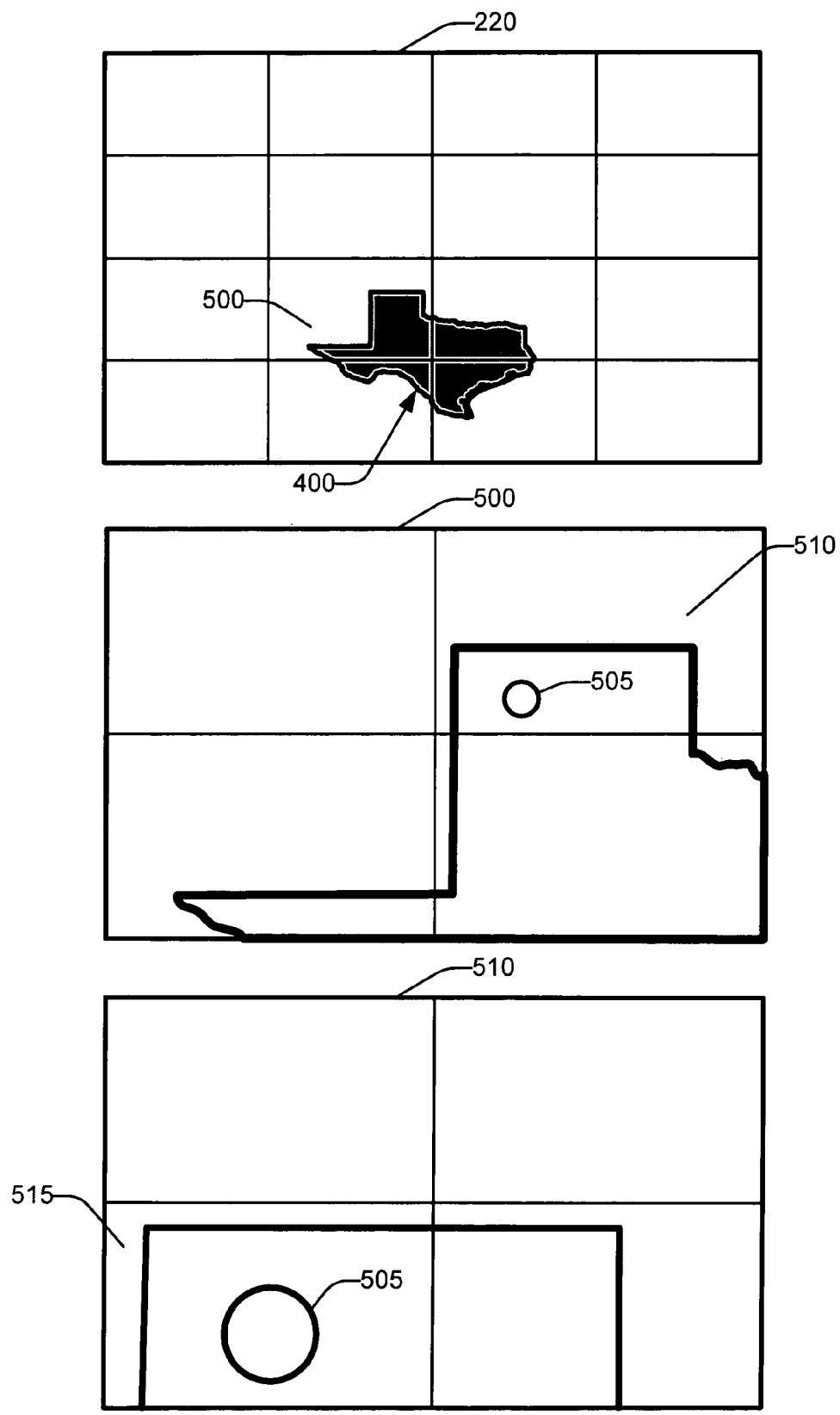
FIG. 5 is an illustration of greater levels of detail and association of a primitive grid to an entity grid.

FIG. 5 shows primitive grid and entity grid relationship at greater level of detail. In this example, a subset of the group of primitive data 400 resides in grid 500 of space 220 of primitive quad-tree 202. Grid 500 is divided into four grids which include grid 510.

Within grid 510 resides a group of primitive data 505 which represent the city of Amarillo. Grid 510 may be further divided into four grids, where grid 510 includes a grid 515. Grid 515 of primitive quad-tree 202 totally encompasses the group of primitive data that represent the city of Amarillo. A corresponding grid in the entity quad-tree 204 may be associated with grid 515. Descriptive data or information as to the city of Amarillo (i.e., group of primitives 505 that represent the city of Amarillo) may be referenced in storage memory by the corresponding grid in the entity quad-tree 204. In this case, a key that relates grid 515 and group of primitives 505 to the grid in entity quad-tree 204 is "0" delta of levels of detail and "None" as to the fan value. A direct relationship exists in this case between the primitive quad-tree grid 515 and its corresponding grid in entity quad-tree 204.

The assignment system described above has several benefits. It will naturally group entity data for features of similar importance, size, and spatial location in a common storage area. This is highly desirable for many spatially directed queries. Features that are likely to be accessed from a spatial query can be stored sequentially on a storage medium to speed retrieval time. There is also a very limited possible set of storage locations for entity data that can be referenced from a single primitive grid.

Figure 6:
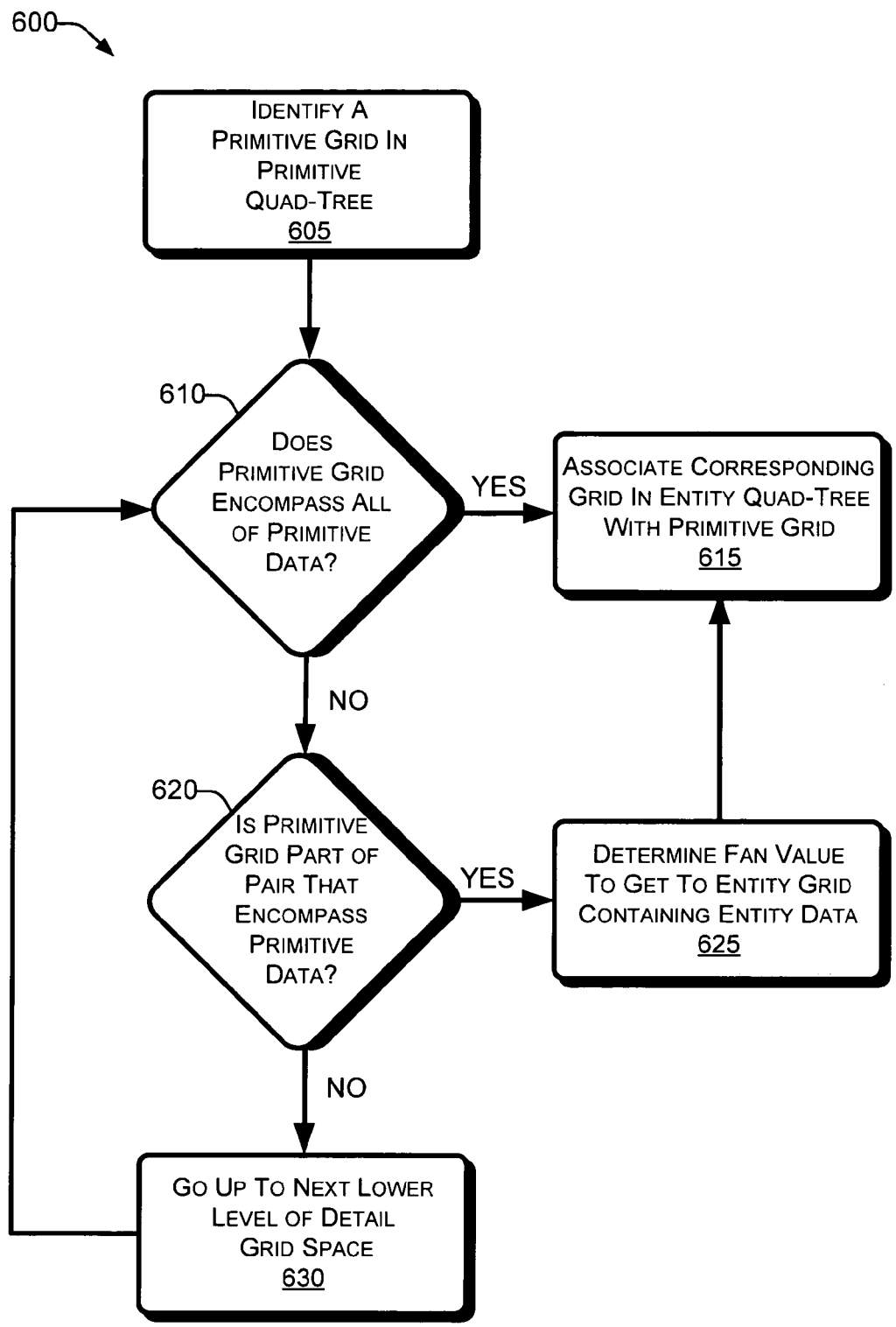
FIG. 6 is a flow diagram illustrating associating primitive grids in a primitive quad-tree to entity grids in a parallel or corresponding entity quad-tree.

FIG. 6 shows a process 600 to associate primitive grids in a primitive quad-tree to entity grids in a parallel or corresponding entity quad-tree. The process 600 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. The process 600 is described with reference to a computing device 100 described above and further described below, that implements an application program that creates electronic document such as a map which contains primitive data Although described as a flowchart, it is contemplated that certain processes may take place concurrently.

At block 605, a particular grid in a primitive quad-tree is identified. The grid may include a group of primitive data that define a particular shape. In the context of a map, the group of primitive data may represent a geographical location such as a country, state, county, city, street, etc.

In certain cases, the identified grid in the primitive quad-tree encompasses or includes the entire group of primitive data that define the particular shape or represent the geographical location (i.e., following the YES branch of block 610).

At block 615, if the identified grid encompasses or includes the entire group of primitive data, an association is made as to a corresponding grid in a parallel entity quad-tree. The corresponding grid has the same index or number assigned to it as the identified grid in the primitive quad-tree.

In other cases, the identified grid in the primitive quad-tree does not encompass or include the entire group of primitive data that define the particular shape or represent the geographical location (i.e., following the NO branch of block 610).

In particular cases, the identified grid in the primitive quad-tree, along with another grid in the primitive quad-tree make up a pair of grids that encompasses or includes the group of primitive data (i.e., following the YES branch of block 620). At block 625, a determination is made as to a fan value that is associated with the identified grid in the primitive quad-tree. A fan value may be part of a key used to get to the particular grid in the entity quad-tree that contains a description or provides information as related to the identified grid in the primitive quad-tree.

In certain cases, the identified grid combined with another grid as a pair does not encompass or include the group of primitive data (i.e., following the NO branch of block 620). At block 630, a grid that is at a lower level of detail in the primitive quad-tree is identified. Such a grid is considered a parent in the quad-tree arrangement to the previously identified grid. This lower level of detail grid includes the previously identified grid and three other child grids in the quad-tree arrangement. Iterations may take place of going to lower level of detail grids until a grid or pair of grids includes or encompasses the group of primitive data. The key discussed above may include an increment in level of detail from the initial identified grid to the lower level of detail grid and any subsequent or intermediate parent grids. In the words, the key would include a value of the number of levels of detail from the initially identified grid to a grid or pair of grids that contain or encompass the group of primitive data.

Computing Device

FIG. 7 shows an example implementation of computing device or computer 100 in greater detail. In particular, application programs may be implemented on the computer 100, that support the above described primitive data and entity data relationship. The computer 100 may be configured with a Windows® brand operating system. The computer 100 includes processing unit or processor 300 described above, a system memory or memory 305 also described above, and a system bus 715 that interconnects various system components, including the memory 305 to the processing unit or processor 300. The system bus 715 may be implemented as any one of several bus structures and using any of a variety of bus architectures, including a memory bus or memory controller, a peripheral bus, and a local bus.

The memory 305 includes read only memory (ROM) 720 and random access memory (RAM) 725. A basic input/output system 730 (BIOS) is stored in ROM 720.

The computer 100 has one or more of the following drives: a hard disk drive 730 for reading from and writing to a hard disk or hard disk array, a magnetic disk drive 735 for reading from or writing to a removable magnetic disk 740, and an optical disk drive 745 for reading from or writing to a removable optical disk 750 such as a CD ROM or other optical media. The hard disk drive 730, magnetic disk drive 735, and optical disk drive 745 are connected to the system bus 715 by a hard disk drive interface 760, a magnetic disk drive interface 765, and an optical drive interface 770, respectively. The drives and their associated computer-readable media provide nonvolatile storage of computer readable instructions, data structures, program modules and other data for computer 100.

Although hard disk 730, removable magnetic disk 735, and removable optical disk 750 are described, other types of computer readable media can be used to store data. Other such media include magnetic cassettes, flash memory cards, digital video disks, Bernoulli cartridges, random access memories (RAMs), read only memories (ROMs), and the like. Additionally, the computer 100 may be configured to serve data stored on an independent system, such as a RAID (redundant array of independent disks) storage system, particularly when implemented as a terminal server.

A number of program modules may be stored on the hard disk 730, magnetic disk 735, optical disk 750, ROM 720, or RAM 725. The programs include a server operating system 775, one or more application programs 310, other program modules 782, and program data 784.

A user may enter commands and information into the computer 100 through input devices such as keyboard 110 and a mouse 788. Other input devices (not shown) may include a microphone, joystick, game pad, satellite dish, scanner, and the like. These and other input devices are connected to the processing unit 300 through a serial port interface 790 that is coupled to the system bus 715, but may alternatively be connected by other interfaces, such a parallel port, game port, or a universal serial bus (USB).

Monitor or screen 105 or other type of display is also connected to the system bus 715 via an interface, such as a video adapter card 794. The computer 100 has a network interface or adapter 796, a modem 798 or other means for establishing communications over network 799, such as an Internet connection. The modem 798 may also facilitate connection from a protocol decoder device. Screen 105 and input devices such as keyboard 110 and mouse 788.

CONCLUSION

The above-described application and electronic document describe associating primitive data with entity data using parallel quad-trees. Although the invention has been described in language specific to structural features and/or methodological acts, it is to be understood that the invention defined in the appended claims is not necessarily limited to the specific features or acts described. Rather, the specific features and acts are disclosed; as exemplary forms of implementing the claimed invention.

What is claimed is:

1. An entity lookup system implemented on a computing device comprising:
   a processor;

a memory in communication with the processor;

a primitive quad-tree stored in the memory and used by the computing device for providing an electronic document, wherein the primitive quad-tree is comprised of grids that encompass primitive data, wherein the primitive data is grouped to define shapes in the electronic document; and an entity quad-tree stored in the memory and comprised of corresponding grids that parallel the grids in the primitive quad-tree, wherein the grids in the entity quad-tree associate entity data to the grids of the primitive quad-tree, wherein the entity data provides information associated with particular groups of primitive data, wherein a single grid in the entity quad-tree contains entity information associated with a plurality of grids in the primitive quad-tree, wherein a plurality of grids of the primitive quad-tree are grouped to encompass a particular shape in the electronic document, wherein a particular grid in the entity quad-tree provides entity data as to the particular shape and is associated with the plurality of grids of the primitive quad-tree that are grouped together to obtain entity information relating to the particular shape.

2. The entity lookup system of claim 1, wherein the primitive data represents a geographical location on a map.

3. The entity lookup system of claim 1, wherein the particular grid in the entity quad tree corresponds to a first level of detail that is lower than a second level of detail of at least some of the plurality of grids of the primitive quad-tree.

4. The entity lookup system of claim 1, wherein a pair of grids in the primitive quad-tree encompasses primitive data that defines a particular shape, and wherein the pair of grids in the primitive quad-tree are associated with a particular single grid in the entity quad-tree to obtain entity information describing the particular shape.

5. The entity lookup system of claim 1, wherein a key is assigned to each of the grids in the primitive quad-tree that associates the grids in the primitive quad-tree with the grids in the entity quad-tree for locating a particular grid in the entity quad-tree containing entity information for a plurality of the grids in the primitive quad-tree.

6. The entity lookup system of claim 5, wherein the key includes a fan value for the grids in the primitive quad-tree that are part of a pair of grids that encompass primitive data that define a particular shape, and wherein the fan value indicates which grid from among a corresponding pair of parallel grids in the entity quad-tree contains the entity data corresponding to the pair of grids that encompass the primitive data that define the particular shape.

7. The entity lookup system of claim 5, wherein the key includes a level of detail value that defines a difference between a grid level of a grid in the primitive quad-tree and a grid level of a grid in the entity quad-tree that provides entity data for the grid in the primitive quad-tree.

8. The entity lookup system of claim 5 wherein the key includes an index value that defines a difference between grid index values between a grid in the primitive quad-tree and a grid in the entity quad-tree that provides entity data for the grid in the primitive quad-tree.

9. A method implemented by one or more processors executing computer-executable instructions stored in one or more computer-readable storage media, the method comprising:

identifying, by the one or more processors, a plurality of grids of primitive data in a primitive quad-tree, wherein the plurality of grids in the primitive quad tree encompass a particular group of primitive data that define a particular shape;

associating, by the one or more processors, the plurality of grids of primitive data that define the particular shape to a single grid in an entity quad-tree, wherein the entity quad tree has corresponding grids that parallel the primitive quad-tree for each of a plurality of different levels of detail, wherein the entity quad-tree stores entity data that provides information associated with particular groups of primitive data, wherein the single grid in the entity quad-tree contains entity information associated with the plurality of grids in the primitive quad-tree that encompass the particular group of primitive data that define the particular shape; and providing a map defined by the primitive data in the grid of the primitive quad-tree, wherein the entity data associated with the primitive data is retrieved from a grid in the entity quad-tree.

10. The method of claim 9, wherein the primitive data represents a geographical location on the map.

11. The method of claim 9, wherein the single grid in the entity quad tree is at a first level of detail that is a lower of detail than a second level of detail of at least some of the plurality of grids of primitive data in a primitive quad-tree that define the shape.

12. The method of claim 11, wherein a fan value is assigned to each of the plurality of grids of primitive data, the fan value further defining associating the grid of the primitive data to the single grid in the entity quad-tree, and wherein the fan value indicates which grid in a corresponding parallel pair of grids in the entity quad tree contains the entity data corresponding to the plurality of grids that encompass the group of primitive data.

13. The method of claim 9, wherein the associating is performed by assigning a key to each of the plurality of grids of primitive data, and wherein the key includes a level of detail value that defines the difference in grid level of the plurality of grids of primitive data and the single grid in the entity quad-tree that stores the entity information for the plurality of grids of primitive data.

14. The method of claim 9, wherein the associating is performed by assigning a key to each of the plurality of grids of primitive data, and wherein the key includes an index value that defines a difference between grid index values of the plurality of grids of primitive data and the single grid in the entity quad-tree that stores the entity information for the plurality of grid of primitive data.

15. The method of claim 9, wherein the grid in the entity quad-tree provides descriptive information as to the shape represented by the plurality of grids of primitive data.

16. For use on a computer, a computer-readable storage medium having instructions implemented by the computer to perform acts comprising:

identifying grids in a primitive quad-tree encompassing primitive data that represent shapes in a map, wherein each grid in the primitive quad-tree contains a particular group of primitive data, each grid in the primitive quad-tree being assigned an index value for distinguishing each grid from the other grids in the primitive quad-tree;

storing entity data that defines the primitive data in an entity quad-tree that includes grids that correspond to the grids in the primitive quad-tree, wherein the entity data provides information associated with a particular group of primitive data, wherein, for each primitive quad-tree grid representing a group of primitive data, a corresponding grid is represented in the entity quad-tree having a corresponding index value, wherein the entity quad-tree represents areas in a memory where the information describing the associated particular groups of primitive data is stored;

assigning a key to each of the grids in the primitive quad-tree, wherein the key assigned to a particular grid in the primitive quad-tree indicates a level offset for associating the grid in the primitive quad-tree with a grid in the entity quad-tree storing entity data associated with the particular grid;

assigning a fan value to the key of each of the grids in the primitive quad-tree, the fan value assigned to a particular grid in the primitive quad-tree indicating a grid in the entity quad-tree in which corresponding entity data is stored;

associating the grids in the primitive quad-tree with grids in the entity quad-tree using the level offsets and the fan values;

providing the map based on the primitive data and corresponding entity data obtained by associating the grids;

receiving a selection of primitive data on the map from a user of the computer;

identifying a first primitive grid in the primitive quad-tree that corresponds to the selection; and when the identified first primitive grid does not encompass an entire group of primitive data corresponding to the selection, but is part of a pair of grids in the primitive quad-tree encompassing the entire group, the first primitive grid is associated with a first entity grid in the entity quad-tree to retrieve associated entity data containing information on the selected primitive data by using the fan value for determining which entity grid in a pair of entity grids corresponding to the pair of grids encompassing the entire group contains the entity data.

17. The storage medium of claim 16,
wherein the identifying each of the grids in the primitive quad-tree includes a level of detail value in addition to the index value for each grid, and
wherein the grids in the entity quad-tree have a same level of detail value and index value as the corresponding parallel grids in the primitive quad-tree.

18. The storage medium of claim 17, wherein, when the identified first primitive grid does encompass the entire group of primitive data corresponding to the selection, the entity data is retrieved from a corresponding grid in the entity quad-tree that has a same level of detail value and a same index value as the first primitive grid.

19. The storage medium of claim 16, wherein the associating is performed using the key that is assigned to each of the grids in the primitive quad-tree, the level offset of the key defining a level of detail difference between a corresponding grid in the primitive quad-tree and a grid in the entity quad-tree that provides the entity data describing the primitive data of the grid in the primitive quad-tree.

20. The storage medium of claim 19, wherein the fan value is a direction flag that indicates a direction of a grid in the entity quad-tree in which the entity data is stored in relation to another grid in the entity quad-tree corresponding to a particular grid in the primitive quad-tree.

* * * * *